(12) United States Patent
Iojoiu et al.

(10) Patent No.: US 12,064,756 B2
(45) Date of Patent: Aug. 20, 2024

(54) METHOD FOR UNBLOCKING PORES IN A SELECTIVE CATALYTIC REDUCTION CATALYST

(71) Applicant: VOLVO TRUCK CORPORATION, Gothenburg (SE)

(72) Inventors: Eduard Emil Iojoiu, Vourey (FR); Patrice Keghelian, Sainte Colombe (FR)

(73) Assignee: VOLVO TRUCK CORPORATION, Gothenburg (SE)

( * ) Notice: Subject to any disclaimer, the term of this patent is extended or adjusted under 35 U.S.C. 154(b) by 287 days.

(21) Appl. No.: 17/778,063

(22) PCT Filed: Nov. 25, 2019

(86) PCT No.: PCT/EP2019/082371
§ 371 (c)(1),
(2) Date: May 19, 2022

(87) PCT Pub. No.: WO2021/104604
PCT Pub. Date: Jun. 3, 2021

(65) Prior Publication Data
US 2022/0401944 A1 Dec. 22, 2022

(51) Int. Cl.
*B01J 38/62* (2006.01)
*B01D 47/12* (2006.01)
(Continued)

(52) U.S. Cl.
CPC .......... *B01J 38/62* (2013.01); *B01D 53/9431* (2013.01); *B01J 29/85* (2013.01); *B01J 29/90* (2013.01);
(Continued)

(58) Field of Classification Search
CPC combination set(s) only.
See application file for complete search history.

(56) References Cited

U.S. PATENT DOCUMENTS 3,712,031 A * 1/1973 Santa Cruz ............ B01D 47/16
261/92
5,478,531 A * 12/1995 Yoshikawa ........... F01N 3/0892
422/219

(Continued)

FOREIGN PATENT DOCUMENTS

EP          3296533 A1   3/2018
WO       2018154031 A1   8/2018

OTHER PUBLICATIONS

International Search Report and Written Opinion for International Patent Application No. PCT/EP2019/082371, mailed Jan. 29, 2020, 10 pages.

*Primary Examiner* — Binh Q Tran
(74) *Attorney, Agent, or Firm* — Sage Patent Group

(57) ABSTRACT

The invention concerns a method for unblocking pores in a metal zeolite based selective catalytic reduction (SCR) catalyst. The method includes filling, at least partially, the SCR catalyst with a liquid, the liquid being preferably distilled water. The method includes letting said liquid inside the SCR catalyst enough time to allow said liquid to dissolve, at least partially, the obstructions and to penetrate into the pores. The method includes heating the SCR catalyst at a temperature above the ebullition temperature of the liquid so as to vaporize the part of the liquid remained into the pores, and generate steam flows through the obstructions, the steam flows removing the obstructions and unblocking the pores, wherein no hydrocarbons are injected during the step of heating.

20 Claims, 7 Drawing Sheets

(51) Int. Cl.

| | | |
|---|---|---|
| *B01D 53/94* | (2006.01) | |
| *B01J 29/85* | (2006.01) | |
| *B01J 29/90* | (2006.01) | |
| *B01J 37/06* | (2006.01) | |
| *B01J 38/48* | (2006.01) | |
| *F01N 1/08* | (2006.01) | |
| *F01N 3/038* | (2006.01) | |
| *F01N 3/04* | (2006.01) | |
| *F01N 3/20* | (2006.01) | |
| *F01N 3/28* | (2006.01) | |
| *F01N 3/30* | (2006.01) | |
| *F01N 13/12* | (2010.01) | |

(52) U.S. Cl.
CPC .............. *F01N 1/08* (2013.01); *F01N 3/2006* (2013.01); *F01N 3/208* (2013.01); *F01N 3/2885* (2013.01); *F01N 3/30* (2013.01); *B01D 47/12* (2013.01); *B01D 2255/50* (2013.01); *B01D 2321/28* (2013.01); *B01J 37/06* (2013.01); *B01J 38/48* (2013.01); *F01N 3/038* (2013.01); *F01N 3/04* (2013.01); *F01N 3/206* (2013.01); *F01N 3/2882* (2013.01); *F01N 3/2896* (2013.01); *F01N 13/12* (2013.01); *F01N 2230/04* (2013.01); *F01N 2370/04* (2013.01); *F01N 2610/02* (2013.01)

(56) References Cited

U.S. PATENT DOCUMENTS

| | | | |
|---|---|---|---|
| 7,033,547 B1* | 4/2006 | Ichikawa | B01D 47/021 |
| | | | 423/239.1 |
| 7,814,746 B2* | 10/2010 | Aketa | F01N 3/025 |
| | | | 422/177 |
| 2016/0016109 A1* | 1/2016 | Strandberg | B01D 53/185 |
| | | | 95/218 |
| 2016/0332113 A1* | 11/2016 | Jenkins | B01D 47/10 |
| 2017/0122156 A1 | 5/2017 | Meister et al. | |
| 2017/0268396 A1* | 9/2017 | Duan | B01D 53/62 |
| 2019/0301331 A1* | 10/2019 | Miyairi | F01N 3/022 |

* cited by examiner

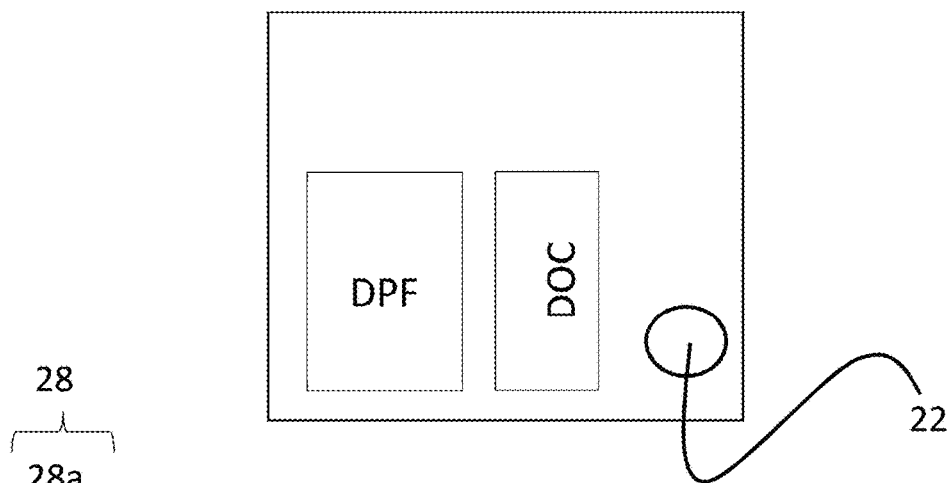
FIG.8
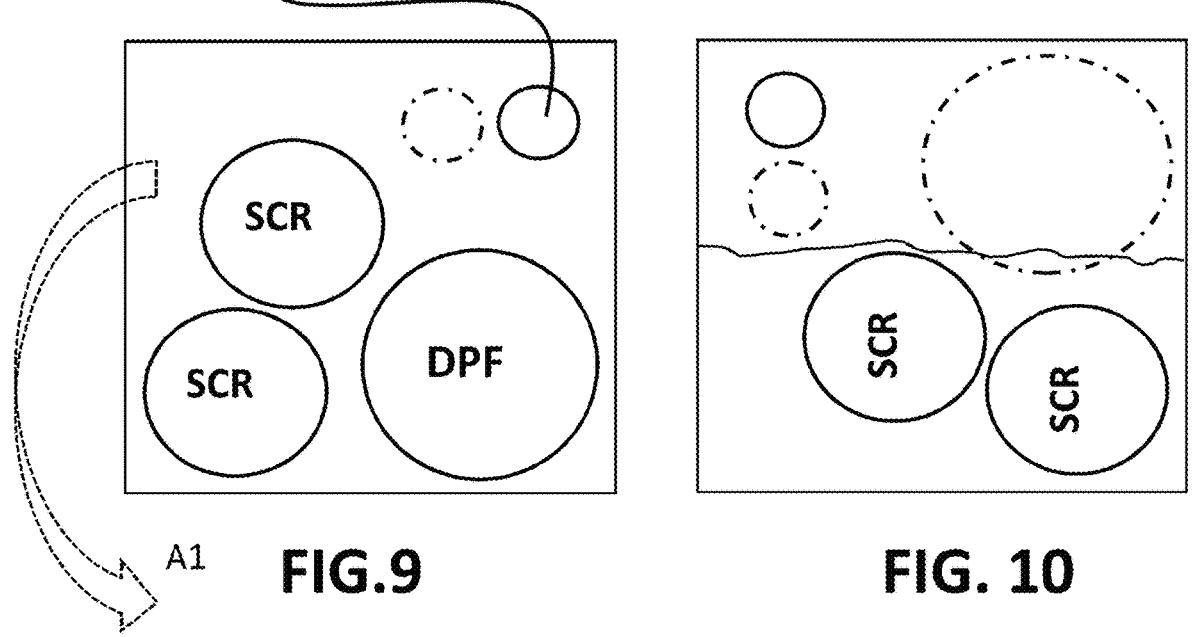
FIG.9
FIG. 10

METHOD FOR UNBLOCKING PORES IN A SELECTIVE CATALYTIC REDUCTION CATALYST

CROSS REFERENCE TO RELATED APPLICATIONS

This application is a 35 U.S.C. § 371 national stage application of PCT International Application No. PCT/EP2019/082371 filed on Nov. 25, 2019, the disclosure and content of which is incorporated by reference herein in its entirety.

TECHNICAL FIELD

The present invention relates to the field of Selective Catalytic Reduction (SCR) catalysts, which are part of an Exhaust After-Treatment System (EATS) of a vehicle.

In particular, the present invention is directed to a method for regenerating a SCR catalyst by unblocking the pores of it, and extend its durability.

BACKGROUND ART

Selective Catalytic Reduction (SCR) catalysts are used for depolluting, in particular for converting Nitrogen Oxides (NOx) into nitrogen and water. They are extensively used in the after-treatment of diesel engine exhaust gas.

Generally, there are two types of EATS architecture: In a first architecture, the muffler includes one box containing a Diesel Particulate Filter (DPF), a Diesel Oxidation Catalyst (DOC) and one or more SCR modules (forming then a "one-box system"). In a second architecture, the EATS includes one box including the DOC and DPF and another box including the SCR module(s) (forming then a "two-box system").

Typically, a SCR catalyst includes a mechanical substrate which is made of ceramics and which does not contribute to NOx reduction (mechanical support) and a washcoat including the catalyst material. Basically, the mechanical substrate is a honeycomb structure defining a plurality of longitudinal channels. The washcoat covers the internal surfaces of the substrate channels. The invention applies specifically to the regeneration of a SCR catalyst in which the washcoat includes a zeolite and active catalytic species, such as copper (Cu), Iron (Fe) or a combination of both.

Zeolite materials are crystalline structures that contain pores (porous structure), which give a large specific surface area available for the catalytic process (SCR reduction).

Although SCR catalysts generally provide a reliable means to depollute exhaust gas from NOx, real-world application have shown that such catalysts may, in certain circumstances, become deactivated (i.e. suffer loss of NOx conversion performance), often at an increasing rate over time. One of the possible cases in which durability issues manifest is pore blocking, since it can reduce the activity of the SCR catalyst. Possible reasons for this phenomenon is the formation of obstructions that restrict access to the active sites.

There are several conceivable methods to deal with performance and durability issues of SCR modules. Arguably the most common is to replace the entire muffler (including the SCR module(s)), which is very expensive. Also, there also exist methods for reactivating metal ions, such as the one disclosed in US 2018/0363528. In this method, the SCR catalyst is exposed to a liquid which is selected to facilitate the movement of metal ions, so as to reintroduce the migrated ions back to the active positions within the SCR catalyst (e.g. recovering deactivated metal zeolite catalysts).

However, to the knowledge of the applicant, there is no method for rectifying a SCR catalyst that suffers from pore blocking. In other words, there is a need to develop a method for unblocking the pores of a SCR catalyst and thereby recover its SCR catalyst performance.

SUMMARY OF THE INVENTION

To this end, the invention concerns a method for unblocking pores blocked by obstructions, inside a selective catalytic reduction (SCR) catalyst comprising zeolite. The SCR catalyst is contained inside a muffler, which is part of an exhaust after treatment system of a vehicle. The method includes:
  S.1. a step of filling in which a liquid is introduced inside the muffler so as to fully immerse each SCR catalyst into the liquid;
  S.2. a step of soaking during which a proportion of the liquid introduced inside the muffler spreads into the pores of the zeolite;
  S.3. a step of draining, at which the excess of liquid introduced inside the muffler is removed out of the muffler; The excess of liquid is, as its name suggests, the proportion of the liquid introduced inside the muffler which did not spread into the pores of the zeolite.
  S.4. a step of drying, at which the SCR catalyst is heated at a temperature above the ebullition temperature of the liquid so as to vaporize the liquid remaining in the pores and generate steam flows through the obstructions, the steam flows removing the obstructions and unblocking the pores, Moreover, no hydrocarbons are injected during the step S.4. of drying.

This method enables to recover the SCR catalyst efficiency and reuse it afterwards in the EATS, without having to change the muffler. Indeed, pores unblocking leads to the recovery of a wide active surface included in the pores, reestablishing the access to the active sites.

Eventually, the invention also concerns a muffler inside which at least SCR catalyst has been treated using the method described above and a vehicle comprising such a muffler.

Other advantageous features, although not compulsory, are detailed in the dependent claims, and in the following detailed specification.

BRIEF DESCRIPTION OF THE DRAWINGS

FIG. 8 is a cross-sectional schematic view of the muffler of FIG. 7;

FIG. 9 is another cross-sectional schematic view of the muffler of FIG. 7;

FIG. 10 represents the muffler of FIG. 9 after it has been tilted.

DETAILED DESCRIPTION

The SCR Catalyst

Figure 1:
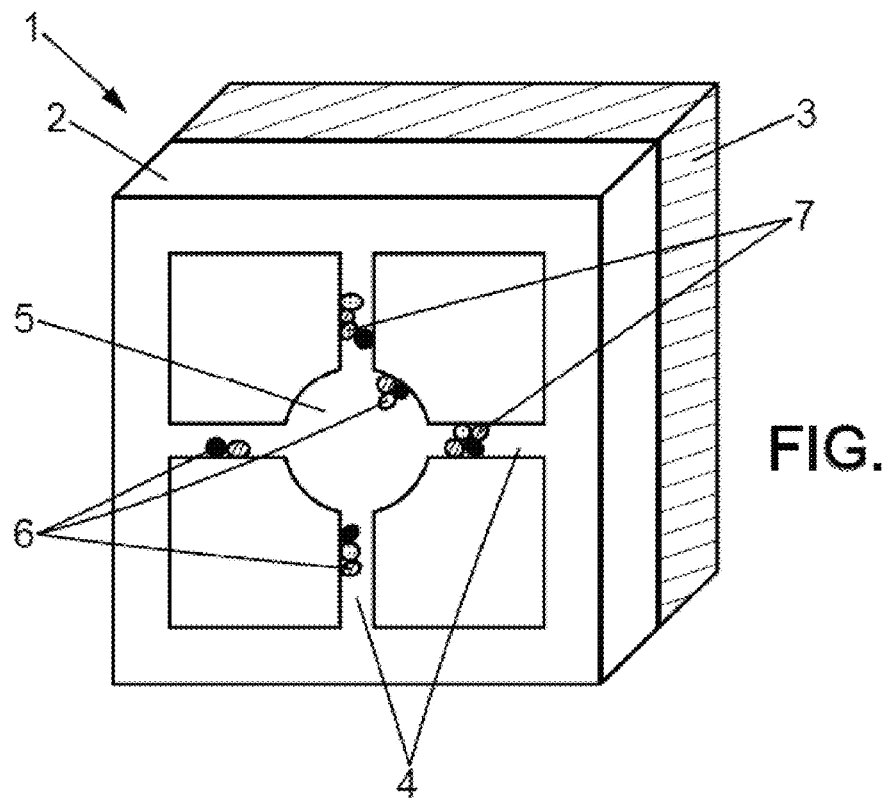
FIG. 1 is a schematic perspective representation of a portion of a SCR module to be treated with the method according to the invention.

As mentioned above and illustrated in FIGS. 1 and 2, a SCR module 1 comprises a SCR catalyst, which generally includes a mechanical support 3 (which is made of ceramics and which does not contribute to NOx reduction) and a washcoat including the catalyst material.

Basically, the mechanical support 3 is a honeycomb structure defining a plurality of longitudinal channels 9 and having an inlet 10 and an outlet 11. The washcoat covers the internal surfaces of the substrate channels 9. In the application field of the invention, the washcoat includes a zeolite 2 and active catalytic species, such as copper (Cu), Iron (Fe) or a combination of both.

Moreover, a mat 13 is provided on the external surface of the mechanical support 3 and a caning 12, generally made of metal. The caning 12 is arranged around the mat 13.

Generally, the SCR catalyst to be treated with the method according to the invention is a metal zeolite 2 based SCR catalyst.

In a preferred embodiment, said metal is selected among Cu, Fe or a combination of Cu and Fe.

In a specific embodiment, the SCR catalyst includes a silico-alumino-phosphate zeolite.

As a person skilled in the art knows, a zeolite is a crystalline structure containing pores. In a SCR catalyst, the species to be treated flow through the pores of the zeolite to active sites, i.e. where the active metal is bonded in the zeolite structure.

In a particular embodiment, the SCR catalyst is part of an exhaust after treatment system of an internal combustion engine, preferably of a diesel engine.

The Pores

As mentioned above zeolites have pores 4 and 5 that may become blocked after a certain time of use and in certain circumstances.

In the meaning of the present disclosure, the porous volume includes a pores network and cavities.

Figure 2:
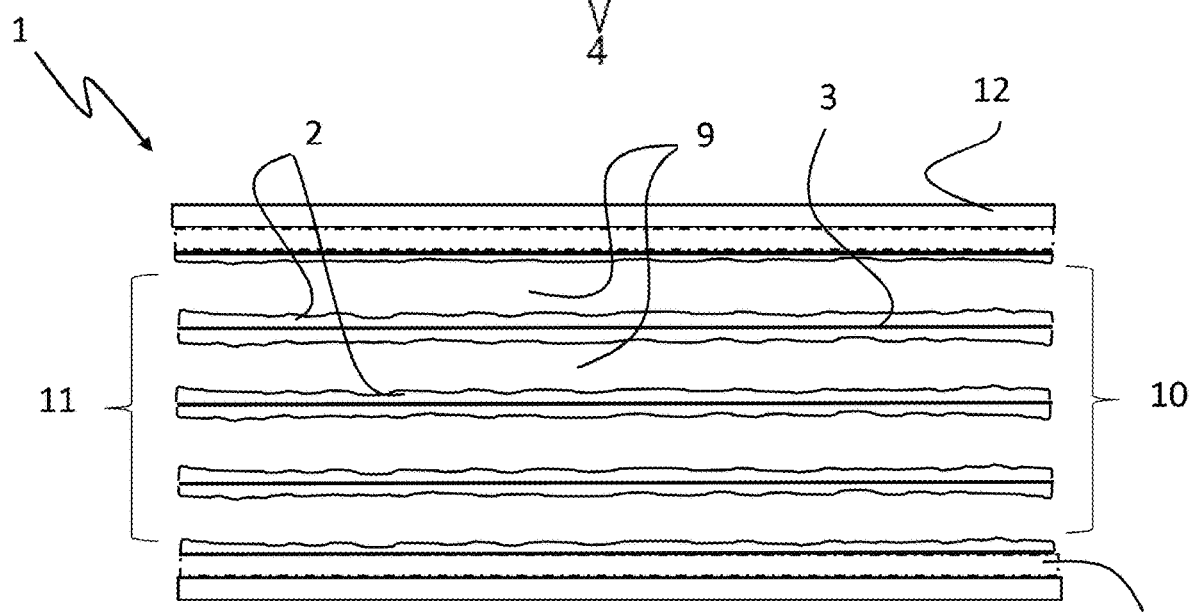
FIG. 2 is schematic cross sectional view of a SCR module.

Indeed, as illustrated in FIG. 1, the zeolite 2 has a porous structure made of pores in the form of a cavity 5 and pores in the form of a conduit 4. The pores in the form of a conduit 4 link the pores in the form of a cavity 5 one to each other's allowing a flow of liquid or gas inside the zeolite 2.

Besides, it is to be understood that one cavity 5 can be accessed by separate conduits 4, meaning that several conduits 4 can lead to the same cavity 5. Indeed, in the present disclosure, a cavity is a pore that is larger than the conduit. The pores in the form of a conduit 4 link different pores in the form of a cavity 5.

The Obstruction of Pores

After a certain period of use, the pores 4, 5 of the zeolite 2 could be partially or fully blocked with obstructions 6, 7.

By "fully blocked", it is meant that the access of reactants to the active sites might be possible by using other pore access (conduits) but this will introduce mass transfer limitation with a negative impact on the catalytic performance. In other words, "fully blocked" means that a conduit 4 is fully obstructed, but it does not mean that the access to a cavity 5 is impossible.

By "partially blocked" it is meant that the pore is not fully obstructed, but that the cross sectional section of the pore is smaller than initially. When a pore is partially blocked some particles, liquids and gases could still enter into or flows through the pore. This will induce also mass transfer limitation.

As mentioned above, obstructions 6, 7 might be composed from elements coming from Zeolite structure (Silicium, Aluminum, Phosphor, active sites or combination of those ones).

Depending, notably, on the time during which the SCR catalyst has been used, the obstructions 6, 7 are more or less dense and large.

As illustrated in FIG. 1, obstructions 6 partially block the pores, while obstructions 7 fully block the pores.

Method for Unblocking the Pores

Figure 3:
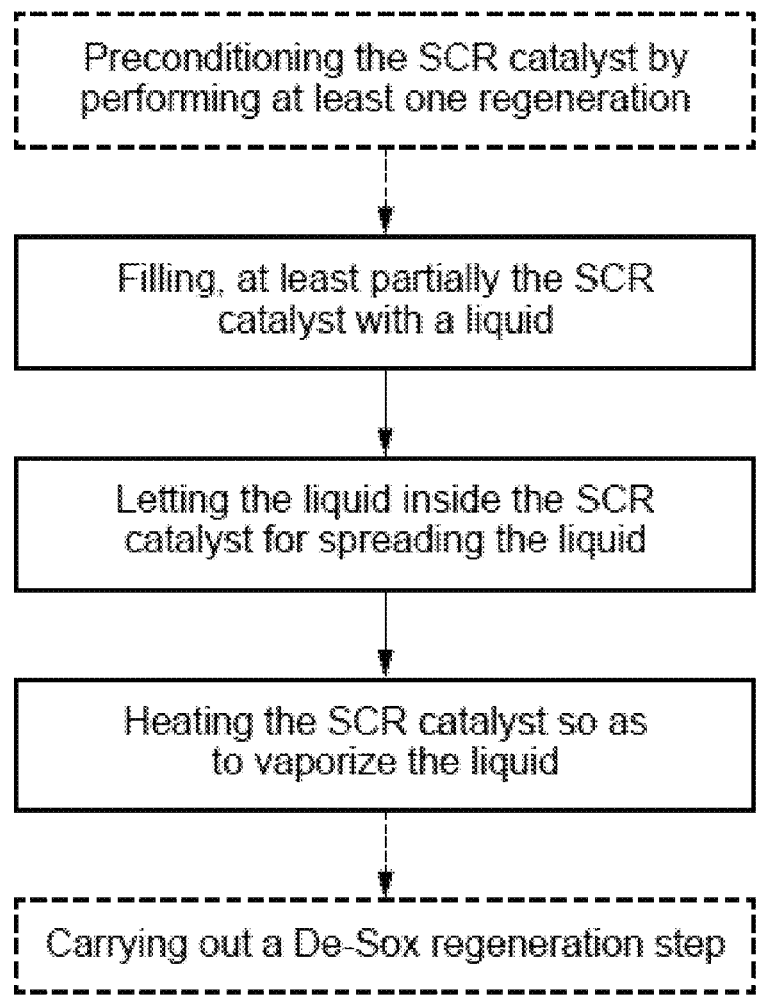
FIG. 3 is a flow chart of the method according to the invention.

FIG. 3 is a flow chart representing the different steps of the method according to the invention. In FIG. 3, solid lines refer to a step which is mandatory for carrying out the method according to the invention, and dotted lines refer to a step which is optional.

In preamble, it is to be understood that the method according to the invention can be performed either with the muffler still on the truck or after having removed the muffler from the truck.

Step S.0: (Pre-Conditioning)

Advantageously, the method according to the invention includes a preliminary step S.0. of regeneration. At the preliminary step S.0 (optional), the SCR module is subjected to a first regeneration sub-step at high temperature, such as a parked regeneration, and/or to a second regeneration sub-step at a lower temperature.

For example, the first regeneration sub-step is performed at a temperature that is between 500° C. and 600° C. (depending on the SCR catalyst type), while the second regeneration sub-step is performed at a temperature comprised between 250° C. and 450° C., for example at 310° C.

The aim of the first regeneration sub-step is to remove sulfur and the aim of the second regeneration sub-step is to remove any hydrocarbons or $NH_3$ eventually still present within the catalyst.

In this respect, hydrocarbons (and possibly urea) can be injected during the first regeneration sub-step to reach the corresponding temperature. However, it is preferred not to inject urea or hydrocarbons during the second regeneration sub-step.

Regeneration sub-steps consist in heating the SCR module(s), by letting hot gas (typically exhaust gas) flow through it. These regeneration sub-steps can be done using the vehicle itself V or an external device.

The external device may be a hot air generator (a.k.a "air heater") capable of supplying air heated to an elevated temperature using electrical energy (electrical heater) or by mixing it with products of combustion from a burner (Furnace oil, High speed diesel (HSD), Light diesel oil (LDO), Liquified Petroleum gas (LPG) or natural gas may be used as fuel).

Step S.1. (Filling)

As already mentioned, FIG. 1 is a schematic perspective representation of a portion of a SCR catalyst 1 to be treated with the method according to the invention.

The first step of the method is to fill, at least partially, the porous volume of the SCR catalyst 1 with a liquid.

The liquid used for filling, at least partially the SCR catalyst, is chosen for its capacity to spread into the pores 4, 5 of the zeolite 2.

In a specific embodiment, the liquid is distilled water. The use of distilled water for filling, at least partially the zeolite, is advantageous for the fact that no additional impurities are introduced in the SCR catalyst.

In another specific embodiment, the liquid has an acidic pH. According to the present disclosure, acidic pH encompasses all pH strictly less than 7.00.

A liquid having an acidic pH could promote the dissolution and/or removal of some components of the obstructions 6, 7. However, liquid having a too low pH (lower than 2) could attack the zeolite.

Thus, when a liquid having an acidic pH is used, it is preferable that the pH is above 2.00, preferably between 2.2 and 4. A suitable liquid could therefore be an aqueous solution comprising a proportion of acetic acid.

In a preferred embodiment, step S.1 is carried out while the SCR catalysts are at a temperature comprised between the ambient temperature and 90° C., preferably between ambient temperature and 60° C.

Step S.2. (Soaking)

So as to ensure that the liquid has enough time to spread in the pores of the zeolite, the method according to the invention comprises a step consisting in letting the liquid penetrate inside the porous volume of the SCR catalyst.

Indeed, the liquid spreads in the pores thanks to capillarity effect. As a person skilled in the art knows, this phenomenon may take some time. In addition, as explained above, pores 4, 5 are partially or fully blocked. In case of partial blockage, the liquid could spread past the obstructions 6, but it takes more time than if the pores were not blocked at all. In case of full blockage, the liquid cannot spread through the obstructions 7, and it follows another way to reach the concerned pores (liquid uses another conduit to reach the pore), what increases the time needed to fill the SCR catalyst.

Moreover, it is not possible to determine neither the numbers of obstructions 6 and 7, nor the volume of pores 4 and 5 that are fully or partially blocked.

Hence, depending on the type of and on the amount of obstruction, the duration of step S.2. (a.k.a "soaking period") is comprised between 10 minutes and 120 minutes, preferably between 30 minutes and 60 minutes.

So as to promote the dissolution and/or removal of obstructions, it may be advantageous to raise the temperature of the liquid, in the provision that the liquid temperature remains under the ebullition point of said liquid.

In practice, and as mentioned above, each SCR module is housed into a muffler. Step S.1 then consists in filling the muffler with the liquid (distilled water or acetic acid solution) so as to fully immerse each SCR module into a bath of liquid (As shown on FIG. 10). When the SCR module(s) is or are immersed into the bath of liquid, during step S.2, the liquid penetrates first into the channels of the SCR module(s) and then into the pores of the zeolite structure, regardless of their status of blockage. Hence, the SCR module(s) remain(s) into said bath enough time to allow said liquid to spread into the pores of the zeolite.

Step S.3. (Draining)

Afterwards, the excess of liquid, that is the liquid that has not penetrated into the pores of the zeolite based SCR catalyst, is drained off the muffler after the soaking period has elapsed.

Precisely, the liquid inside the channels of the SCR module and the one outside the SCR modules, is drained out of the muffler. Liquid absorbed inside the pores of the zeolite remains inside the SCR module.

Step S.4. (Heating)

The fourth step of the method is a step of heating the SCR catalyst 1 so as to vaporize the liquid and create steam for removing the obstructions 6 and 7.

By heating, the liquid takes more space since its volumetric mass density decreases. This induces an increase in the pressure in the pores 4 and 5 that leads to the removal of the obstructions 6 and 7.

In a preferred embodiment, step S.4 is implemented by heating the SCR catalyst 1 at a maximal temperature T1 comprised between 250° C. and 470° C., preferably between 280° C. and 330° C. Therefore, the maximal temperature to which is subjected the SCR catalyst is significantly lower than the one recommended in US 2018/0363528 A1. Indeed, US 2018/0363528 A1 teaches that the SCR catalyst should be held at extremely high temperatures for a period of time (e.g., 500° C. for six hours, 700° C. for two hours, etc.). This is consistent with the fact that, in this publication, the aim is to reactivate active sites by reinserting the metal ions back into their active position and that such effect can be obtained only in specific conditions of pH and temperature: In particular, ions migration occurs only when the temperature is above 500° C.

Preferably, step S.4 lasts during a period of time comprised between 20 minutes and 120 minutes, preferably between 30 minutes and 90 minutes.

It is mandatory that, during the step of drying (Step S.4), the HI injector is deactivated so that no hydrocarbons are introduced in the gas flow. Accordingly, no Hydrocarbons interact with the liquid still present in the pores, avoiding any unwished chemical reaction between the liquid or the vapors of said liquid and the hydrocarbons, since such interaction could negatively impact the cleaning process.

It is preferred that, during the drying, the urea injector is deactivated as well, so that no urea is injected during step S.4. This also enable to avoid any unwished chemical reaction between the liquid or the vapors of said liquid and urea, since such interaction could negatively impact the cleaning process.

In an alternative embodiment, the step S.4 of drying includes two phases at two different temperatures, for example a first phase at a temperature comprised between 310° C. and 330° C., and a second phase at a higher temperature, e.g. at a temperature comprised between 430° C. and 460° C., e.g. 450° C.

In a particular embodiment, step S.4 consists in letting hot gas, for example exhaust gas, flowing through the muffler. Alternatively, the flow of hot gas can be a flow of hot air, generated by an air heater.

Optional Step S.5: De-SOx Parked Regeneration

Optionally, step S.4 may be followed by a step S.5 consisting essentially in a parked De-SOx regeneration, so as to remove sulphur and its derivatives. As it is known per se, a parked De-SOx regeneration consists in increasing the temperature of the exhaust gases flowing through the SCR module(s) to a high level that is between 500° C. and 600° C., depending on the SCR catalyst type. To do that, a small quantity of fuel is introduced in the exhaust gas flow upstream of the muffler. The fuel then vaporizes and oxidizes in the Diesel Oxidation Catalyst (DOC), which produces an exothermic effect. As its name indicates, a parked De-SOx regeneration is performed while the vehicle V is parked (but engine is turned on).

Generally, a parked De-SOx regeneration consists in increasing the temperature of the exhaust gas to a first level that is comprised between 350° C. and 500° C. and then to a second level that is comprised between 500° C. and 600° C., depending on the type of SCR catalyst.

Ways for Implementing the Method According to the Invention

Figure 5:
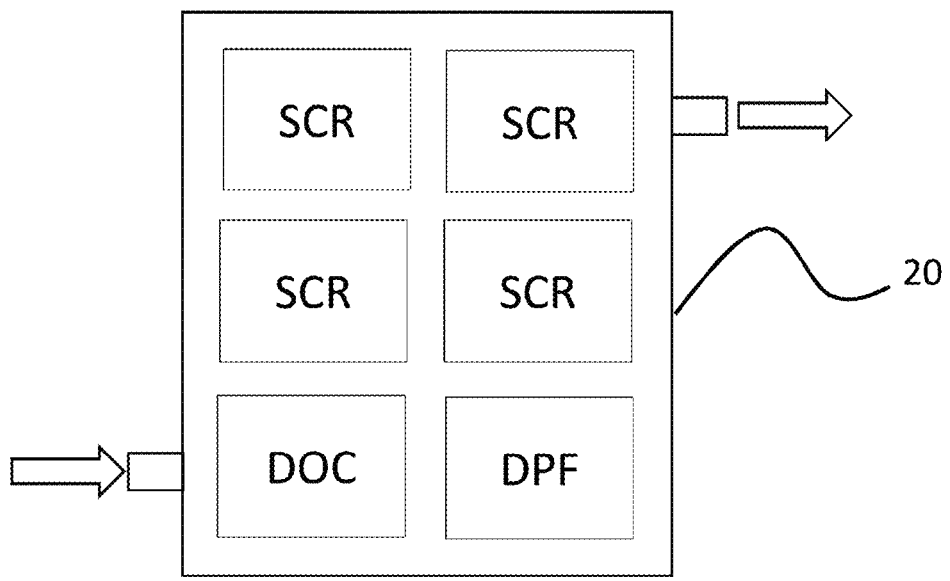
FIG. 5 is a schematic view of a "one box" EATS.

The method according to the invention is particularly adapted to SCR catalyst being part of an exhaust after treatment system of an internal combustion engine, preferably of a diesel engine. In such a system and as shown on FIG. 5, the components of the EATS are received inside a muffler 20 (forming then a "one-box" system), as represented on FIG. 5. Precisely, the muffler 20 includes a DOC, a DPF and one or more SCR Catalyst(s).

Figure 7:
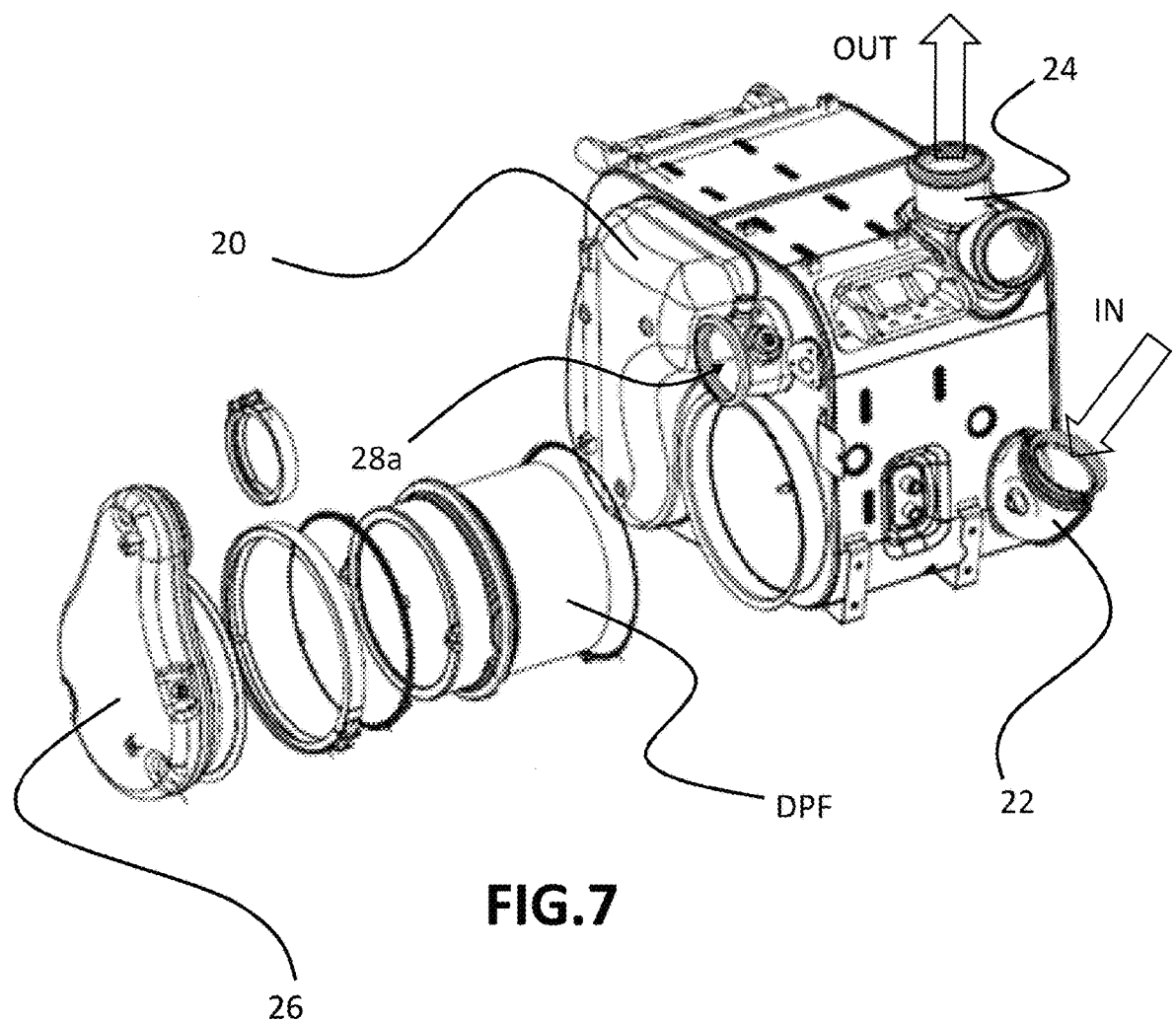
FIG. 7 is an exploded view of a muffler according to a "one-box" system.

The muffler 20 is, according to general knowledge, the metallic envelope inside which are housed the EATS components and inside which the exhaust gas flows before being rejected into the atmosphere. As shown on FIG. 7, the muffler 20 includes an inlet 22 through which exhaust gas coming from the ICE flows IN and an outlet 24 through which post-treated exhaust gas flows OUT.

Basically, the muffler includes a first compartment inside which are housed the DOC and the DPF, a tier-drop 26 (a.k.a "DPF cover"), an urea mixing pipe 28 and a second compartment inside which are received the SCR modules. One orifice 28a of the urea mixing pipe 28 is shown on FIG. 7. This orifice 28a is uncovered, and then accessible from outside of the muffler, when the tier-drop 26 is removed.

The tier-drop 26 connects the first compartment to the urea mixing pipe 28. Its is a pear-shaped portion.

The urea mixing pipe 28 is U-shaped. As its name indicates, it is a device in which the flow of exhaust gas is mixed with a proportion of urea (injected).

In the order, the Exhaust gas flow first through the first compartment (DOC and DPF), then through the tier-drop 26, through the urea mixing pipe 28 and finally through the second compartment (SCR modules).

Figure 6:
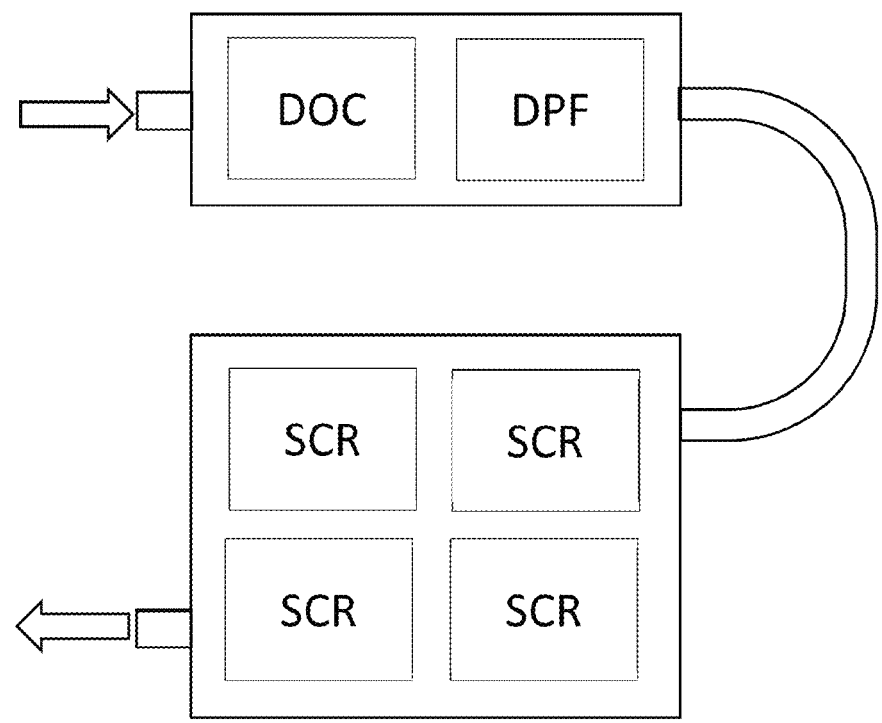
FIG. 6 is a schematic view of a "two-box" EATS.

Alternatively, and as shown on FIG. 6, the EATS includes one box including the DOC and DPF and another box including the SCR module(s) (forming then a "two-box system").

The SCR catalyst(s) (a.k.a "SCR ceramic bricks") are usually maintained inside the muffler using welding connections. It is therefore very difficult to remove the SCR catalyst(s) out of the muffler, that is why the method of the invention has been set up so that there is no need to remove the SCR catalysts (ceramics bricks) outside of the muffler.

Accordingly, Step S.1 consists in filling directly the muffler 20 with said vaporizable liquid.

The possibility to perform the method of the invention directly in the muffler enables to avoid having to remove the muffler 20 from the vehicle V, saving therefore time and operation costs.

Figure 4:
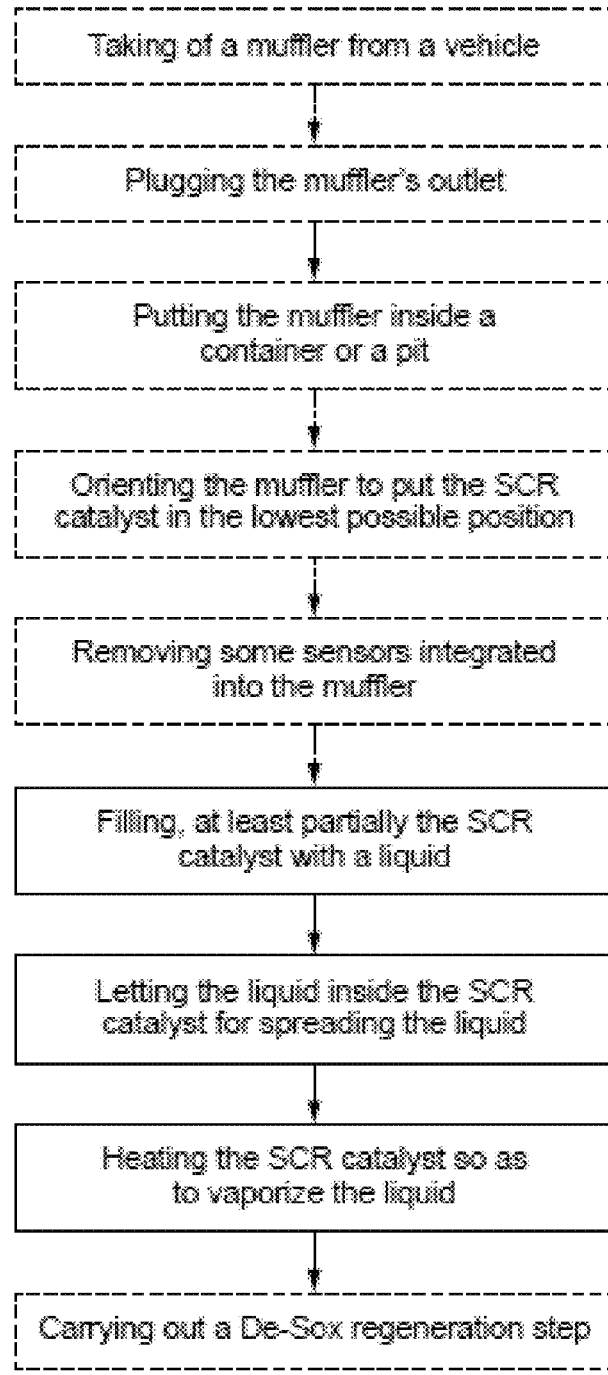
FIG. 4 is a flow chart of the method according to a particular embodiment of the invention.

Advantageously, when the method according to the invention is performed when the muffler is dismounted from the vehicle V, the method further comprises the following sub-steps as illustrated in FIG. 4:
- a sub-step Ss.10. consisting essentially in taking off the muffler 20 from a vehicle V;
- a sub-step Ss.11. consisting essentially in plugging at least the muffler's outlet 24;
- a sub-step consisting in removing the tier-drop 26 to uncover the access (28a) to the urea mixing pipe 28 where the liquid will enter during the step of filling and to remove the DPF to avoid damaging it while filling step.
- a sub-step Ss.12. consisting essentially in putting the taken off muffler inside a container or a pit (not shown);
- a sub-step Ss.13. consisting essentially in orienting the muffler so as to place the SCR catalyst(s) in the lowest possible position into the muffler. To do that, and as shown on FIGS. 9 and 10, the muffler 20 is tilted at 90°. This tilting motion is represented by arrow A1 on FIG. 9.
- an optional sub-step Ss.14. consisting in removing some sensors (not shown) integrated into the muffler, such as NOx sensor, delta pressure sensor, etc. Even if it does not influence the performance of the method itself, removing these sensors enables to prevent damaging them.
- a sub-step Ss.15. consisting in removing the DPF to avoid splashing liquid on it during the step of filling. This is why the DPF does not appear on FIG. 10.

In this embodiment, step S.1. is carried out by filling partially the muffler with the liquid until the SCR catalyst are fully immersed (See FIG. 10, on which it is represented the level of liquid inside the muffler after the step of filling is complete). Then, the excess of liquid is removed, the liquid which has penetrated into the pores 4, 5 of the zeolite 2 remaining into said pores 4, 5.

The excess of liquid includes the volume of liquid stored inside the channels of the SCR brick(s) and the volume around the SCR module(s), but inside the muffler.

Alternatively, the method can be performed without having to remove the muffler from the vehicle V. In this case, it is also needed to remove some part(s) of the muffler, in particular the DPF cover (a.k.a "Tier-drop") 26, to uncover a direct access 28a to the SCR modules and to avoid damaging the DOC or the DPF by spreading liquid on it.

Also, an adaptor may be needed to introduce the liquid properly inside the muffler and to avoid that liquid drops on the floor.

In both cases, the muffler's outlet 24 shall be plugged to maintain the liquid inside the muffler.

Also, the step of drying could be made once the muffler has been reinstalled onto the vehicle V, meaning that exhaust gas could be used to perform the step of drying.

Figure 11:
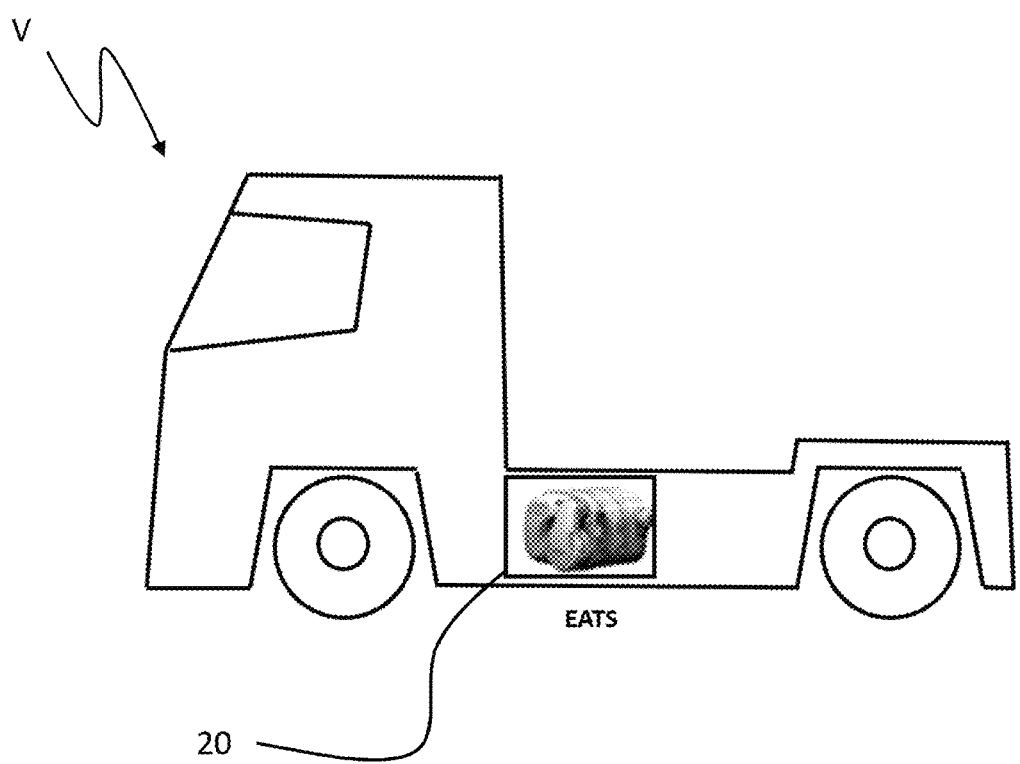
FIG. 11 represents a vehicle, in particular a truck, together with its EATS.

One example of a vehicle V on which the method of the invention can be applied is represented on FIG. 11, together with its EATS. It is to be understood that, even if FIG. 11 shows a truck, the invention can be applied to any other light-duty, medium-duty or heavy-duty vehicles, such as passenger cars, buses, boats or construction machines.

Installation for Implementing the Method According to the Invention

Alternatively, it can be envisaged to perform all steps of the method, and in particular the step of drying, without using exhaust gas coming from an engine. To do that, there is a need for a specific installation, as described below.

The installation for implementing the method described above, comprises:
- A device for filling the SCR catalyst with liquid according to step S.1, such device would include at least a pump and an outlet hose;
- An external device for heating the SCR module(s) according to step S.4, for example by letting hot air flowing through the muffler.

The external device for heating the SCR module(s) is a hot air generator (a.k.a "air heater") capable of supplying air heated to an elevated temperature by using fuel combustion (burner) or electricity (electrical heater). This device includes a fan or a compressor for creating an air flow to be heated. Since this type of device is well known, it is not described in more details.

Device for Filling the SCR Catalyst

In case the SCR is not removed from the muffler, the device for filling the SCR catalyst with liquid includes a pump for pumping the liquid from a reservoir to the muffler access orifice 28a.

If the EATS system is a two-box system, it is preferred to fill in the muffler with liquid through the inlet (As described above in connection with the 1-box system). However, it can be also envisaged to place the muffler containing the SCR module(s) inside a bath of liquid. In this particular embodiment, the device which is used for filling the muffler with the liquid is then a tank or a container. In this embodiment, there is no need to remove some parts of the muffler as for the "one-box" system.

Device for Heating the Zeolite

The external device for heating the SCR module(s) is a hot air generator (a.k.a "air heater") capable of supplying air heated to an elevated temperature by using fuel combustion (burner) or electricity (electrical heater). Since this type of device is well known, it is not described in more details.

In case the SCR catalyst has been removed from the muffler, it may be envisaged to use a specific oven equipped with a ventilation system capable of generating a strong air flow. Since this type of device is well known, it is not described in more details.

EXAMPLES

Example 1 (E1)

A muffler containing a SCR catalyst is dismounted from a vehicle.

The muffler comprising an inlet and an outlet is then filled in with 80 L of distilled water through the inlet after having plugged the outlet (step S.1).

After 60 minutes of soaking (step S.2), the outlet is unplugged and the excess of distilled water (about 75 L) is removed from the muffler. The rest of the distilled water remains in the SCR catalyst inside the pores of the zeolite.

The muffler is then heated at 310° C. for 60 minutes (step S.4) by letting exhaust gas flowing through the muffler.

The NOx conversions (%) of the SCR catalyst before and after applying the method according to example 1 are set forth in table 1.

Example 2 (E2)

Example 1 is reproduced with an aqueous solution comprising 5% of acetic acid (vinegar) instead of distilled water.

The NOx conversions (%) of the SCR catalyst before and after applying the method according to example 2 are set forth in table 1.

Counter-Example 1 (CE1)

A method similar to that disclosed in US 2018/0363528 has been reproduced. In this method, drying has been done directly using a parked regeneration at 600° C., during which hydrocarbons have been injected to boost the temperature increase.

The NOx conversions (%) of the SCR catalyst before and after having applied the method according to counter-example 1 are set forth in table 1 below.

Conclusion on the Examples

TABLE 1

| | NOx conversion results | | |
|---|---|---|---|
| Example | NOx conversion (%) before | NOx conversion (%) after | NOx conversion recovery (%) |
| E1 | 83 | 97 | 14 |
| E2 | 81 | 94 | 13 |
| CE1 | 80 | 82 | 2 |

Thus, it appears that the method according to the invention allows a better NOx conversion recovery than the method disclosed in US 2018/0363528.

The invention claimed is:

1. A method for unblocking pores blocked by obstructions, inside a selective catalytic reduction (SCR) catalyst comprising a zeolite, whereby the SCR catalyst is contained inside a muffler which is part of an exhaust after treatment system (EATS) of a vehicle, wherein the method includes:
    filling in which a liquid is introduced inside the muffler so as to fully immerse each SCR catalyst into the liquid;
    soaking during which a proportion of the liquid introduced inside the muffler spreads into the pores of the zeolite;
    draining, at which the excess of liquid introduced inside the muffler is removed out of the muffler; and
    drying, at which the SCR catalyst is heated at a temperature above an ebullition temperature of the liquid so as to vaporize the liquid remaining in the pores and generate steam flows through the obstructions, the steam flows removing the obstructions and unblocking the pores, and wherein no hydrocarbons are injected during the drying.

2. The method according to claim 1, wherein the step of drying comprises letting hot gas, comprising at least one of exhaust gas or hot air, flowing through the muffler.

3. The method according to claim 1, further comprising a preliminary step of regeneration.

4. The method according to claim 3, wherein the preliminary step of regeneration comprises a first regeneration sub-step at a high temperature, and/or a second regeneration sub-step at a lower temperature.

5. The method according to claim 1, wherein no urea is injected during drying.

6. The method according to claim 1, wherein the duration of soaking is comprised between 10 minutes and 120 minutes.

7. The method according to claim 1, wherein drying is implemented by heating the SCR catalyst at a maximal temperature comprised between 250° C. and 470° C.

8. The method according to claim 1, wherein drying lasts during a period of time comprised between 20 minutes and 120 minutes.

9. The method according to claim 1, wherein the drying is followed by a step comprising essentially in a parked De-SOx regeneration to remove sulphur and its derivatives.

10. The method according to claim 1, wherein the filling consists in plugging an orifice of the muffler and in manually pouring the liquid into another orifice of the muffler.

11. The method according to claim 1, wherein said liquid is distilled water.

12. The method according to claim 1, wherein said liquid is an aqueous solution comprising acetic acid, with a pH between 2 and 4.

13. The method according to claim 1, further comprising:
taking off the muffler from the vehicle;
plugging at least an outlet of the muffler;
putting the muffler taken off inside a container or a pit; and
orienting the muffler to place the SCR catalyst(s) in a lowest possible position into the muffler.

14. A vehicle, comprising a muffler inside which at least one SCR catalyst has been treated using the method according to claim 1.

15. The method according to claim 13, further comprising removing sensors integrated into the muffler.

16. The method according to claim 15, wherein the sensors comprise at least one of a NOx sensor, a delta pressure sensor, and other sensors.

17. The method according to claim 1, wherein the duration of soaking is between 30 minutes and 60 minutes.

18. The method according to claim 1, wherein drying is implemented by heating the SCR catalyst at a maximal temperature comprised between 280° C. and 330° C.

19. The method according to claim 1, wherein drying lasts during a period of time comprised between 30 minutes and 90 minutes.

20. The method of claim 4, wherein the first regeneration sub-step at a high temperature comprises a parked regeneration.

* * * * *